US008696842B2

(12) United States Patent
Shigetomi et al.

(10) Patent No.: US 8,696,842 B2
(45) Date of Patent: Apr. 15, 2014

(54) METHOD FOR REPAIRING A MEMBER COMPRISING A FIBER-REINFORCED PLASTIC

(75) Inventors: Toshikazu Shigetomi, Tokyo (JP); Atsumi Tanaka, Tokyo (JP); Kaoru Onohara, Aichi (JP); Koichi Hasegawa, Tokyo (JP)

(73) Assignee: Mitsubishi Aircraft Corporation, Aichi (JP)

( * ) Notice: Subject to any disclaimer, the term of this patent is extended or adjusted under 35 U.S.C. 154(b) by 0 days.

(21) Appl. No.: 13/580,599

(22) PCT Filed: Jan. 26, 2011

(86) PCT No.: PCT/JP2011/000399
§ 371 (c)(1),
(2), (4) Date: Oct. 12, 2012

(87) PCT Pub. No.: WO2011/105007
PCT Pub. Date: Sep. 1, 2011

(65) Prior Publication Data
US 2013/0025770 A1    Jan. 31, 2013

(30) Foreign Application Priority Data
Feb. 24, 2010    (JP) .................. 2010-038989

(51) Int. Cl.
*F16B 19/04*    (2006.01)
(52) U.S. Cl.
USPC .......................................... 156/98

(58) Field of Classification Search
USPC ............................................. 156/98
See application file for complete search history.

(56) References Cited

U.S. PATENT DOCUMENTS

| 3,143,156 | A | * | 8/1964 | Murphy et al. | 152/370 |
| 3,773,097 | A | * | 11/1973 | Mullins | 152/370 |
| 5,190,611 | A | | 3/1993 | Cologna et al. | |
| 2007/0234544 | A1 | * | 10/2007 | Bogue | 29/402.01 |

FOREIGN PATENT DOCUMENTS

| JP | 11-348141 A | 12/1999 |
| JP | 2003-136606 A | 5/2003 |
| JP | 2006-187897 A | 7/2006 |
| JP | 2009-285917 A | 12/2009 |

OTHER PUBLICATIONS

International Search Report for PCT/JP2011/000399; Feb. 22, 2011.
International Preliminary Report for PCT/JP2011/000399; Jan. 26, 2011.

* cited by examiner

*Primary Examiner* — Jeff Aftergut
*Assistant Examiner* — Jaeyun Lee
(74) *Attorney, Agent, or Firm* — Pearne & Gordon LLP

(57) ABSTRACT

There is provided a method for repairing a member comprising a fiber-reinforced plastic, which method can repair a through hole easily at a low cost. When a through hole 20 is repaired, a temporary hole 11 is formed, a fabric sheet 30 comprising reinforcing fibers is rolled into a cylindrical shape and inserted into the temporary hole 11, the fabric sheet 30 is impregnated with a resin, the resin is cured, and a new through hole 20' is formed.

12 Claims, 4 Drawing Sheets

METHOD FOR REPAIRING A MEMBER COMPRISING A FIBER-REINFORCED PLASTIC

TECHNICAL FIELD

The present invention relates to a method for repairing a member comprising a fiber-reinforced plastic, which method is used to form aircraft, ships, vehicles, and the like.

BACKGROUND ART

In recent years, various members have been formed of a fiber-reinforced plastic (resin) using carbon fibers and the like as a reinforcement.
In the case where a member comprising a fiber-reinforced plastic is fixed to another structural member, in the case where another part or the like is attached to the member comprising a fiber-reinforced plastic, and in the like cases, a through hole is sometimes formed in the member comprising a fiber-reinforced plastic.

When such a through hole is formed, in some cases, delamination occurs around the through hole, or the through hole is formed slantwise by working error.

Also, cracks and the like may be generated around the through hole by fastening a bolt and nut and other fasteners with an excessive force.

To repair such a through hole, there has been available a method in which a tapered hole is formed by removing a portion in the range including the damaged portion around the through hole, a plug that comprises a fiber-reinforced plastic and has a shape such as to fit the tapered hole is bonded to the tapered hole, and a new through hole is re-formed (for example, refer to Patent Literature 1).

CITATION LIST

Patent Literature

Patent Literature 1: U.S. Pat. No. 5,190,611

SUMMARY OF INVENTION

Technical Problem

In the above-described method, unfortunately, time and effort are required to produce the plug comprising a fiber-reinforced plastic. Also, to bring the plug into close contact with the tapered hole, the taper angles of the plug and tapered hole must be formed with high accuracy, which requires effort and cost.

Further, although one tapered hole can correspond to through holes having diameters in a certain range, in order to correspond to through holes having various diameters, preparation must be made so that tapered holes having a plurality of diameters can be formed. Necessarily, plugs corresponding to these tapered holes must be prepared, which costs a lot of money.

The present invention has been accomplished to solve the above technical problems, and accordingly an object thereof is to provide a method for repairing a member comprising a fiber-reinforced plastic, which method can repair a through hole easily at a low cost.

Solution to Problem

To achieve the above object, the present invention provides a method for repairing a member comprising a fiber-reinforced plastic, comprising the steps of forming a hole in a repair portion to be repaired of the member; rolling a strip-shaped fabric sheet comprising reinforcing fibers into a cylindrical shape and inserting the rolled fabric sheet into the hole; impregnating the fabric sheet in the hole with a resin; and heating the resin with which the fabric sheet has been impregnated to cure the resin.

The repair portion is, for example, a through hole formed in the member. In this case, in the step of forming the hole, the hole is formed by removing a range including the through hole from the member. That is, the hole is formed by widening the through hole. After the fabric sheet has been inserted into this hole and impregnated with the resin to fill the hole, a new through hole is formed. Thereby, the through hole can be repaired.

The repair portion is not limited to the through hole. For example, even when foreign matters get into the member or a flaw is present in the member, the foreign matters or flaw is removed by forming the hole, the fabric sheet is inserted into this hole, and the fabric sheet is impregnated with the resin, whereby repair can be made.

In the above-described repairing method, since the fabric sheet has only to be rolled and inserted into the formed hole, a plug or the like matching the diameter of the hole need not be prepared in advance.

Further, the fabric sheet can be rolled into a cylindrical shape by being wound around a rod-shaped core material.

Also, the hole can be of a tapered shape, and the fabric sheet can be rolled into a tapered shape and inserted into the hole. Further in this case, the fabric sheet can be of a triangular or trapezoidal shape such that the width thereof decreases gradually, and the fabric sheet can be rolled into a tapered shape. Therefore, the fabric sheet having been rolled into a tapered shape is preferably inserted into the hole.

In place of the above-described fabric sheet, a prepreg sheet can also be used.

That is, the present invention provides a method for repairing a member comprising a fiber-reinforced plastic, comprising the steps of forming a hole in a repair portion to be repaired of the member; rolling a strip-shaped prepreg sheet, which is formed by impregnating reinforcing fibers with a resin, into a cylindrical shape and inserting the rolled prepreg sheet into the hole; and heating the resin with which the prepreg sheet has been impregnated to cure the resin.

Advantageous Effects of Invention

According to the present invention, in the repairing method, the hole has only to be formed in the repair portion, and the fabric sheet has only to be rolled and inserted into the formed hole, so that a plug or the like matching the diameter of the hole need not be prepared in advance.
Further, the fabric sheet can be rolled into a cylindrical shape by being wound around a rod-shaped core material. Thereby, the through hole can be repaired easily at a low cost.

Also, when the through hole is repaired, since the fabric sheet wound into a cylindrical shape so as to wrap the newly formed through hole is present around the new through hole, effects of recovering the bearing strength around the through hole and recovering the bypass strength can be achieved.

DESCRIPTION OF EMBODIMENTS

The present invention will now be described in detail based on embodiments shown in the accompanying drawings.

First Embodiment

FIGS. 1, 2A, 2B, 2C and 2D are views for explaining the method for repairing a member comprising a fiber-reinforced plastic in accordance with a first embodiment.

Figure 1:
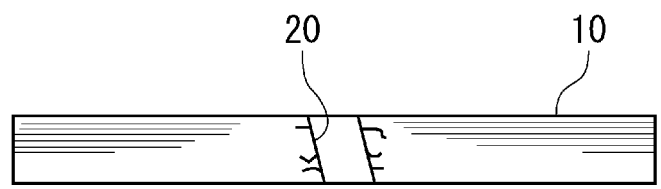
FIG. 1 is a view showing an example of a member to which a method for repairing a member comprising a fiber-reinforced plastic is applied.
Figure 2A:
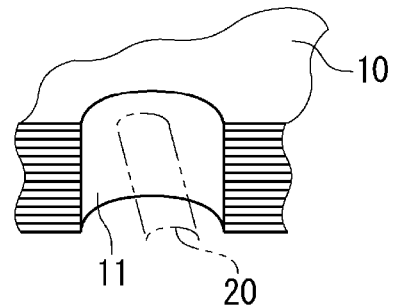
FIGS. 2A, 2B, 2C and 2D are views showing a flow of a method for repairing a member comprising a fiber-reinforced plastic.

As shown in FIG. 1, when a through hole 20, which is formed in a member 10 comprising a fiber-reinforced plastic that is formed by impregnating reinforcing fibers such as carbon fibers with a resin and is cured, is formed slantwise, or a trouble such as delamination occurs around the through hole 20, to repair this through hole 20, first, the member 10 around the through hole 20 including a portion to be repaired is removed by cutting using various types of tools as shown in FIG. 2A. Thereby, a temporary hole (hole) 11 is formed in the member 10. This temporary hole 11 is preferably formed so as to have a minimum necessary diameter.

Figure 2B:
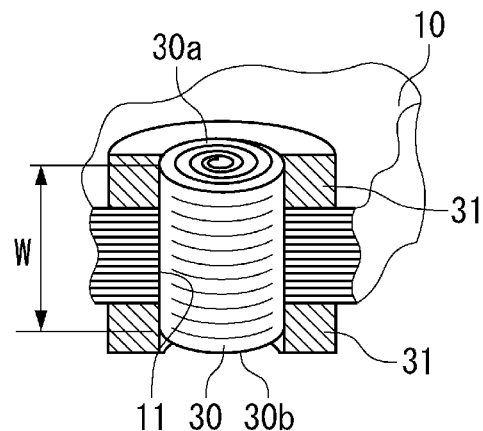

Next, as shown in FIG. 2B, a fabric sheet 30 comprising reinforcing fibers is rolled into a cylindrical shape and inserted (plugged) into the temporary hole 11. At this time, the fabric sheet 30 is preferably rolled as tightly as possible.

Also, it is preferable that the fabric sheet 30 having a width W greater than the thickness of the member 10 be used so that when the fabric sheet 30 is inserted into the temporary hole 11, both end portions 30a and 30b of the fabric sheet 30 having been rolled into a cylindrical shape project from both surfaces of the member 10.

Before or after the rolled fabric sheet 30 is inserted into the temporary hole 11, a ring-shaped backup plate 31 having the same inside diameter as that of the temporary hole 11 is attached to both surfaces of the member 10 with an adhesive, an adhesive tape, or the like appropriate bonding means.

Figure 2C:
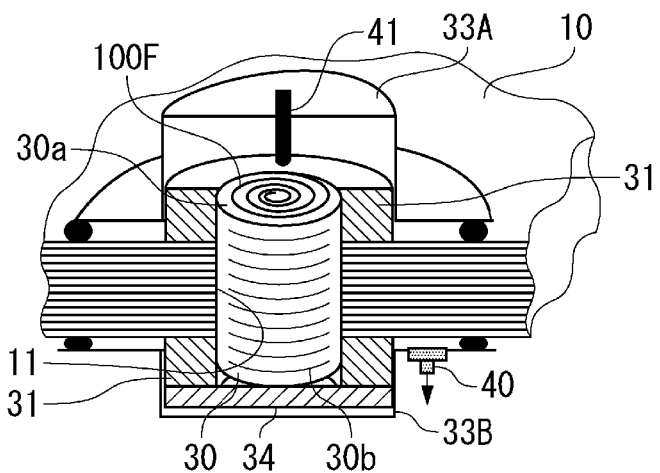

Thereafter, as shown in FIG. 2C, vacuum bags 33A and 33B are set onto both surfaces of the member 10 so as to cover the fabric sheet 30, which is inserted into the temporary hole 11, and the backup plates 31. Also, on the lower side of the temporary hole 11, a lid member 34 for closing the opening of the backup plate 31 is mounted.

To either one of the vacuum bags 33A and 33B, a suction hose 40 of an aspirator is connected. Also, to either one of the vacuum bags 33A and 33B, an injection hose 41 of a resin injecting device is connected.

Thereafter, the atmosphere of a space in the vacuum bags 33A and 33B is sucked via the suction hose 40 by using a negative pressure generating source such as a vacuum pump of the aspirator, whereby the space in the temporary hole 11, into which the fabric sheet 30 has been inserted, is made in a negative pressure state.

Then, a thermosetting resin is supplied via the injection hose 41 from a resin material tank of the resin injecting device. By the negative pressure in the vacuum bags 33A and 33B, the resin is injected into the vacuum bags 33A and 33B, and the fabric sheet 30 in the temporary hole 11 is impregnated with the resin.

Next, the fabric sheet 30 and the resin in the temporary hole 11 are heated by using an appropriate heater to cure the resin. Thereby, the member 10 is made in a state in which the temporary hole 11 is filled with a fiber-reinforced material 100F.

Figure 2D:
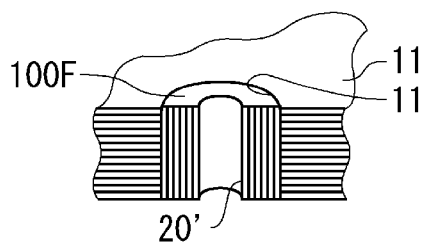

Thereafter, as shown in FIG. 2D, the fiber-reinforced materials 100F projecting from both surfaces of the member 10 are removed by using a cutting tool or the like.

Then, by forming a new through hole 20', the repair of the through hole 20 is completed.

As described above, the method of the first embodiment is such that when the through hole 20 is repaired, the temporary hole 11 is formed, the fabric sheet 30 comprising reinforcing fibers is rolled into a cylindrical shape and inserted into the temporary hole 11, the fabric sheet 30 is impregnated with a resin and the resin is cured, and a new through hole 20' is formed. Thereby, a plug molded in advance need not be prepared, and the through hole 20 can be repaired easily.

Also, in accordance with the diameter of the through hole 20, the diameter of the rolled fabric sheet 30 has only to be changed, so that the fabric sheet can correspond to any through hole easily at a low cost.

Second Embodiment

Next, a second embodiment of a method for repairing a member comprising a fiber-reinforced plastic in accordance with the present invention is described. In the description below, the same reference signs are applied to elements common to those of the first embodiment, and the explanation of these elements is omitted.

In this embodiment, the step of first forming the temporary hole 11 is the same as the first step in the first embodiment.

Figure 3:
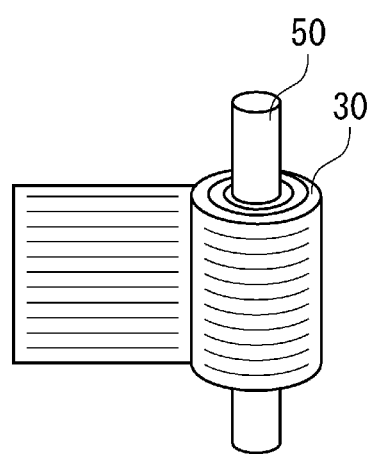
FIG. 3 is a view showing an example of a case where a core material is used when a fabric sheet is rolled.

Next, the fabric sheet 30 comprising reinforcing fibers is rolled into a cylindrical shape and inserted (plugged) into the temporary hole 11. At this time, as shown in FIG. 3, the fabric sheet 30 is wound in advance around a core material 50 comprising a plastic, metal, or the like. By winding the fabric sheet 30 around the core material 50, the fabric sheet 30 can be rolled easily and tightly as compared with the first embodiment.

The subsequent steps are the same as those in the first embodiment. That is, the atmosphere of the space in the vacuum bags 33A and 33B is sucked by using the negative pressure generating source such as the vacuum pump of the aspirator, whereby the space in the temporary hole 11 is made in a negative pressure state. Then, a thermosetting resin is injected from the resin material tank of the resin injecting device, and the fabric sheet 30 in the temporary hole 11 is impregnated with the resin.

Next, the fabric sheet 30 and the resin in the temporary hole 11 are heated by using the appropriate heater to cure the resin, the fiber-reinforced materials 100F and the core materials 50 projecting from both surfaces of the member 10 are removed by using the cutting tool or the like. Thereby, the member 10 is made in a state in which the temporary hole 11 is filled with the fiber-reinforced material 100F. Therefore, by forming a new through hole 20', the repair of the through hole 20 is completed.

Thus, the same effects as those of the first embodiment can be achieved.

Further, by winding the fabric sheet 30 around the core material 50, the fabric sheet 30 can be arranged in the temporary hole 11 by being wound easily and compactly.

Figure 4A:
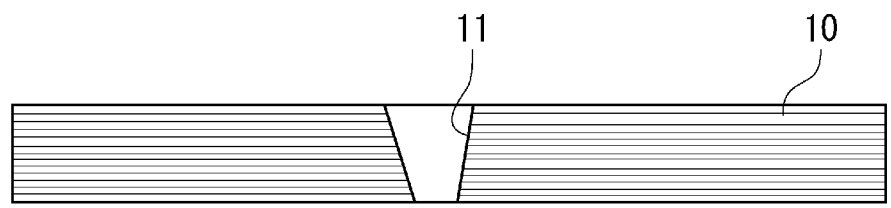
FIGS. 4A and 4B are views showing an example of a case where a temporary hole is of a tapered shape, FIG. 4A being a sectional view showing a member in which a taper-shaped temporary hole is formed, and FIG. 4B being a schematic view showing an example in which a fabric sheet is wound into a tapered shape to be inserted into the temporary hole.

In the above-described embodiments, the temporary hole 11 is of a straight shape having an even diameter. However, the temporary hole 11 can be of a tapered shape as shown in FIG. 4A.

Figure 4B:
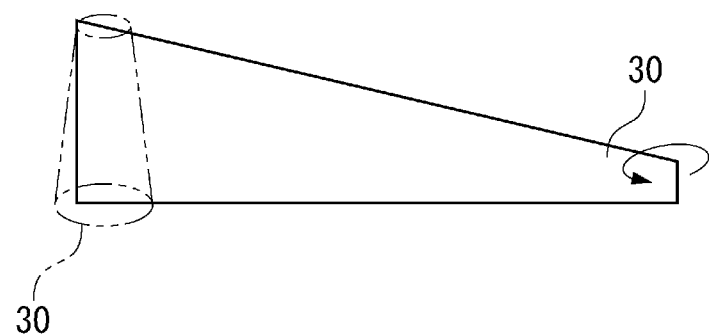

In this case, as shown in FIG. 4B, the fabric sheet 30 having a triangular shape or a trapezoidal shape is used, whereby the fabric sheet 30 can be rolled into a tapered shape corresponding to the taper-shaped temporary hole 11.

Also, in the above-described embodiments, the configuration is such that the fabric sheet 30 is impregnated with the resin by vacuum suction. However, the configuration can be made such that a so-called prepreg sheet, which is formed by impregnating, in advance, the fabric sheet 30 with the resin, is used, and this prepreg sheet is rolled and inserted into the temporary hole 11.

Besides, the configurations described in the above-described embodiments can be selected, can be combined, or can be changed to other configurations as appropriate without departing from the spirit and scope of the present invention.

REFERENCE SIGNS LIST

10 . . . member, 11 . . . temporary hole (hole), 20 . . . through hole, 30 . . . fabric sheet, 33A, 33B . . . vacuum bag, 34 . . . lid member, 40 . . . suction hose, 41 . . . injection hose, 50 . . . core material, 100F . . . fiber-reinforced material

The invention claimed is:

1. A method for repairing a member comprising a fiber-reinforced plastic, comprising the steps of:
    forming a hole in a repair portion to be repaired of the member;
    rolling a strip-shaped fabric sheet comprising reinforcing fibers into a cylindrical shape and inserting the rolled fabric sheet into the hole, wherein the fabric sheet is impregnated with a resin after being inserted into the hole;
    attaching a backup plate to the member; wherein the backup plate comprises a ring, wherein an inside diameter of the backup plate is identical to that of the hole in the repair portion and
    heating the resin with which the fabric sheet has been impregnated in a negative pressure state to cure the resin, wherein the heating the resin occurs after the fabric sheet is inserted into the hole.

2. The method for repairing a member comprising a fiber-reinforced plastic according to claim 1, wherein the repair portion is a through hole, and in the step of forming the hole, the hole is formed by removing a range including the through hole from the member; and
    further, the method comprises a step of forming a new through hole after the resin has been heated and cured.

3. The method for repairing a member comprising a fiber-reinforced plastic according to claim 1, wherein the fabric sheet is rolled into a cylindrical shape by being wound around a rod-shaped core material.

4. The method for repairing a member comprising a fiber-reinforced plastic according to claim 1, wherein the hole is of a tapered shape, and the fabric sheet is rolled into a tapered shape and inserted into the hole.

5. The method for repairing a member comprising a fiber-reinforced plastic according to claim 4, wherein the fabric sheet is of a triangular or trapezoidal shape such that the width thereof decreases gradually, and the fabric sheet is rolled into a tapered shape.

6. The method for repairing a member comprising a fiber-reinforced plastic according to claim 1, wherein the backup plate is attached to both surfaces of the member.

7. The method for repairing a member comprising a fiber-reinforced plastic according to claim 1, wherein the backup plate is attached to the member with an adhesive.

8. The method for repairing a member comprising a fiber-reinforced plastic according to claim 1, further comprising the step of:
    mounting a lid member on one side of the hole in the repair portion.

9. The method for repairing a member comprising a fiber-reinforced plastic according to claim 1, wherein the backup plate comprises a hole that supports the rolled fabric sheet by a surface of the hole.

10. The method for repairing a member comprising a fiber-reinforced plastic according to claim 8, wherein the one side of the hole comprises a lower side of the hole, the lower side being opposite to a side of the hole into which the resin is injected.

11. The method for repairing a member comprising a fiber-reinforced plastic according to claim 8, wherein the one side of the hole is spaced from an opposite side of the hole in the direction of gravity.

12. The method for repairing a member comprising a fiber-reinforced plastic according to claim 8, wherein the rolled fabric sheet is enclosed by vacuum bags, wherein the one side of the hole comprises the side to which an atmosphere of a space in the vacuum bags is sucked.

\* \* \* \* \*